(12) United States Patent
Morita et al.

(10) Patent No.: US 7,781,522 B2
(45) Date of Patent: Aug. 24, 2010

(54) CURABLE SILICONE COMPOSITION AND CURED PRODUCT THEREOF

(75) Inventors: Yoshitsugu Morita, Chiba Prefecture (JP); Minoru Isshiki, Ehime Prefecture (JP); Hiroshi Ueki, Chiba Prefecture (JP); Atsushi Togashi, Midland, MI (US)

(73) Assignee: Dow Corning Toray Company, Ltd., Tokyo (JP)

( * ) Notice: Subject to any disclaimer, the term of this patent is extended or adjusted under 35 U.S.C. 154(b) by 295 days.

(21) Appl. No.: 10/578,798

(22) PCT Filed: Nov. 4, 2004

(86) PCT No.: PCT/JP2004/016716

§ 371 (c)(1),
(2), (4) Date: Jan. 12, 2007

(87) PCT Pub. No.: WO2005/044920

PCT Pub. Date: May 19, 2005

(65) Prior Publication Data

US 2007/0225437 A1    Sep. 27, 2007

(30) Foreign Application Priority Data

Nov. 7, 2003    (JP)    ............... 2003-378521

(51) Int. Cl.
*C08G 77/52*    (2006.01)
*C08G 77/00*    (2006.01)
*C08L 83/04*    (2006.01)

(52) U.S. Cl. ................. 524/862; 528/43; 525/477
(58) Field of Classification Search ............. 525/477
See application file for complete search history.

(56) References Cited

U.S. PATENT DOCUMENTS

| | | | |
|---|---|---|---|
| 3,410,820 A * | 11/1968 | Harrod .............. | 524/860 |
| 5,021,494 A | 6/1991 | Toya | |
| 5,143,951 A * | 9/1992 | Ohta et al. .......... | 523/435 |
| 5,206,312 A * | 4/1993 | Liao et al. .......... | 525/474 |
| 5,319,005 A * | 6/1994 | Hagiwara et al. ....... | 523/435 |
| 5,516,858 A | 5/1996 | Morita et al. | |
| 5,530,075 A | 6/1996 | Morita et al. | |
| 5,623,026 A * | 4/1997 | Buekers et al. ........ | 525/463 |
| 5,952,439 A * | 9/1999 | Morita et al. ......... | 525/476 |
| 7,138,467 B2 * | 11/2006 | Furukawa et al. ...... | 525/476 |
| 2003/0010962 A1* | 1/2003 | Kuwabara et al. ...... | 252/573 |
| 2003/0207123 A1* | 11/2003 | Brunelle et al. ........ | 428/423.7 |
| 2004/0198925 A1* | 10/2004 | Morita et al. ......... | 525/525 |
| 2005/0080204 A1* | 4/2005 | Furukawa et al. ...... | 525/477 |
| 2005/0159577 A1* | 7/2005 | Davis et al. .......... | 528/198 |

FOREIGN PATENT DOCUMENTS

| | | |
|---|---|---|
| EP | 0571965 A1 | 12/1993 |
| EP | 0647682 A1 | 4/1995 |
| EP | 1162239 A2 | 12/2001 |
| EP | 1319690 A2 | 6/2003 |
| JP | 05295084 A | 11/1993 |
| JP | 05320514 A | 12/1993 |
| JP | 06056999 A | 3/1994 |
| JP | 6-306084 | 11/1994 |
| JP | 7-022441 | 1/1995 |
| JP | 07053870 A | 2/1995 |
| JP | 7-118365 | 5/1995 |
| JP | 10-130465 | 5/1998 |
| JP | 10-147764 | 6/1998 |
| JP | 10-163232 | 6/1998 |
| JP | 2005154766 A | 6/2005 |
| WO | WO 03072656 A1 | 9/2003 |
| WO | WO 2006118334 A1 | 11/2006 |
| WO | WO 2008032575 A1 | 3/2008 |

OTHER PUBLICATIONS

English language abstract for JP6306084 extracted from espacenet.com database on Aug. 11, 2006.
English language abstract for JP7118365 extracted from espacenet.com database on Aug. 11, 2006.
English language abstract for JP7022441 extracted from espacenet.com database on Jan. 9, 2007.
English language abstract for JP10130465 extracted from espacenet.com database on Aug. 11, 2006.
English language abstract for JP10147764 extracted from espacenet.com database on Aug. 11, 2006.
English language abstract for JP10163232 extracted from espacenet.com database on Aug. 11, 2006.

(Continued)

*Primary Examiner*—Randy Gulakowski
*Assistant Examiner*—Robert Loewe
(74) *Attorney, Agent, or Firm*—Howard & Howard Attorneys PLLC

(57) ABSTRACT

A curable silicone composition includes: (A) an organopolysiloxane represented by the siloxane unit formula (1) given below and having at least two univalent organic groups that contain epoxy groups and are free of aromatic rings: $[R^1{}_3SiO_{1/2}]_a[R^2{}_2SiO_{2/2}]_b[R^3SiO_{3/2}]_c$ (where $R^1$, $R^2$, and $R^3$ are univalent organic groups, at least two of which are univalent organic groups which contain epoxy groups and are free of aromatic rings; more than 20 mole % of $R^3$ are aryl groups; a+b+c equals 1; on average, "a" satisfies the following condition: $0 \leq a \leq 0.8$; on average, "b" satisfies the following condition: $0.2 \leq b \leq 0.8$; and, on average, "c" satisfies the following condition: $0.2 < c < 1.0$); (B) a linear-chain organopolysiloxane having at least two univalent organic groups that contain phenolic hydroxyl groups; and (C) a curing accelerator.

13 Claims, No Drawings

OTHER PUBLICATIONS

English language translation and abstract for JP 05295084 extracted from PAJ database Jul. 6, 2009, 56 pages.
English language translation and abstract for JP 05320514 extracted from PAJ database dated Jul. 6, 2009, 44 pages.
English language translation and abstract for JP 06056999 extracted from PAJ database dated Jul. 6, 2009, 71 pages.
English language translation and abstract for JP 07053870 extracted from PAJ database dated Jul. 6, 2009, 51 pages.
English language translation and abstract for JP 2005154766 extracted from PAJ database dated Jul. 6, 2009.
PCT International Search Report for PCT/JP2004/016716 dated Feb. 17, 2005, 2 pages.
PCT International Search Report for PCT/JP2007/066829 dated Dec. 6, 2007, 4 pages.

* cited by examiner

US 7,781,522 B2

1

CURABLE SILICONE COMPOSITION AND CURED PRODUCT THEREOF

RELATED APPLICATIONS

This application claims priority to and all the advantages of International Application number PCT/JP2004/016716, filed on Nov. 4, 2004, which claims priority to Japanese patent application number JP2003-378521, filed on Nov. 7, 2003.

TECHNICAL FIELD

The present invention relates to a curable silicone composition, and, more particularly, to a curable silicone composition that is characterized by excellent curability and is capable of producing a cured product having high flexibility and improved adhesive characteristics.

BACKGROUND ART

Known curable compositions, such as epoxy resin compositions, are normally used as sealing and adhesive agents for connection and sealing of elements in electric and electronic devices. In a cured form, however, such compositions possess high modulus of elasticity and therefore have high rigidity. Therefore, when such seals are subject to thermal expansion, they develop high stress in respective elements of electric and electronic devices. This stress causes the aforementioned elements and substrates to warp, leads to formation of cracks in the cured resin itself, or even damages the electric and electronic elements, or forms gaps between the electric, electronic elements and the seals.

It has been proposed to reduce the stress generated in cured resins of the aforementioned type by utilizing a curable resin composition in which a curable resin is combined with an epoxy-containing silicone resin (see Japanese Unexamined Patent Publication [hereinafter referred to as Kokai] H5-29504, equivalent to U.S. Pat. No. 5,530,075), die-attach pastes prepared from the reaction product of an epoxy resin, cyanate resin, and an epoxy-containing dimethylsiloxane compound (see Kokai H10-147764 and Kokai H10-163232), die-bonding materials such as reaction products of an epoxy-containing silicone oil and a phenol-type organic compound (see Kokai H7-22441, Kokai H7-118365, and H10-130465), etc. However, cured bodies obtained from such a composition still remain relatively rigid, show insufficient stress-reduction effect, and find only limited application for sealing and connecting electronic and electric elements.

On the other hand, cured products obtained from curable silicone resin compositions are characterized by excellent electrical characteristics such as dielectric properties, volume resistivity, insulation breakdown strength, etc., and therefore they find application as seals and adhesives for electrical parts and electrical and electronic elements. However, the aforementioned curable silicone compositions produce cured objects that are either too soft and possess high thermal expansion, or have low strength and modulus of elasticity. Therefore, they cannot provide sufficient protection for electric and electronic parts, e.g., against externally applied impacts. Another disadvantage of curable silicone compositions is low adhesion of cured objects produced from these compositions to various electrical and electronic elements. This drawback leads to delamination of the aforementioned cured objects from the respective electric and electronic elements. Attempts have been made to reduce thermal expansion of the soft cured bodies by combining the composition with various fillers, but addition of the fillers led to sharp increase

2 in the modulus of elasticity, so that the cured bodies were produced with impaired softness and elasticity. In other words, the effect of improvement was insufficient.

It has been proposed in Kokai H6-306084 to use a curable silicone resin composition with a shortened time of gelling. This composition consists of an epoxy-modified silicone oil and a phenol-modified silicone oil. Such a composition, however had poor curability and required a prolonged time for curing.

DISCLOSURE OF INVENTION

The authors have conducted a study aimed at the solution of the above problems. As a result of this study, the problems of the prior art have been solved, and the authors arrived at the present invention.

More specifically, it is an object of the present invention to provide a curable silicone composition that can be quickly cured and, when cured, forms a cured resin object that possesses excellent flexibility and adhesive properties.

More specifically, the invention relates to a curable silicone composition comprising:

(A) an organopolysiloxane represented by the siloxane unit formula (1) given below and having at least two univalent organic groups that contain epoxy groups and are free of aromatic rings:

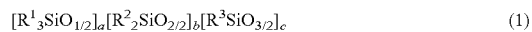
$$[R^1{}_3SiO_{1/2}]_a[R^2{}_2SiO_{2/2}]_b[R^3SiO_{3/2}]_c \quad (1)$$

(where $R^1$, $R^2$, and $R^3$ are univalent organic groups, at least two of which are univalent organic groups which contain epoxy groups and are free of aromatic rings; more than 20 mole % of $R^3$ are aryl groups; a+b+c=1; on average, "a" satisfies the following condition: $0 \leq a \leq 0.8$; on average, "b" satisfies the following condition: $0 \leq b \leq 0.8$; and, on average, "c" satisfies the following condition: $0.2 \leq c \leq 1.0$);

(B) a linear-chain organopolysiloxane having at least two univalent organic groups that contain phenolic hydroxyl groups; and (C) a curing accelerator.

The curable silicone composition of the present invention that comprises components (A), (B), and (C), described above, makes it possible to accelerate curing, and shorten time required for heating during the steps of forming or curing. Since the composition allows reducing of internal stress caused by thermal expansion that takes place in forming, it can be used as a material for protecting delicate, weak, and brittle parts against damage. Furthermore, the composition of the present invention provides stronger adhesion of parts to their respective substrates. The curable composition of the present invention demonstrates improved adhesion to substrates for such materials of poor adhesive properties as solder resist, nickel, and copper. Therefore, the proposed composition is suitable for use as adhesive, coating, casting, and sealing materials in the production of electrical parts and electronic elements.

Component (A) is an organopolysiloxane represented by the siloxane unit formula (1) given below. This component may comprise $[R^3SiO_{3/2}]$ units; $[R^1{}_3SiO_{1/2}]$ units together with $[R^3SiO_{3/2}]$; $[R^2{}_2SiO_{2/2}]$ together with $[R^3SiO_{3/2}]$ units; or $[R^1{}_3SiO_{1/2}]$ units, $[R^2{}_2SiO_{2/2}]$ units, and $[R^3SiO_{3/2}]$ units. Component (A) may have a net-like or three-dimensional structure.

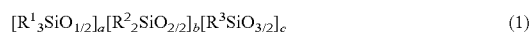
$$[R^1{}_3SiO_{1/2}]_a[R^2{}_2SiO_{2/2}]_b[R^3SiO_{3/2}]_c \quad (1)$$

In the above formula, $R^1$, $R^2$, and $R^3$ are univalent organic groups, at least two of which are univalent organic groups, which contain epoxy groups and are free of aromatic rings. It is required that the epoxy-containing univalent organic groups be free of aromatic rings. This is because, with aromatic rings in the epoxy-containing univalent organic groups, it would be difficult to provide rapid curing of the composition of the present invention. The epoxy group of component (A) reacts with the phenolic hydroxyl group of component (B), thus providing cross-linking and curing.

It is recommended for univalent organic groups to have 1 to 20 carbon atoms. Such groups can be exemplified by methyl groups, ethyl groups, propyl groups, butyl groups, pentyl groups, or similar alkyl groups; phenyl groups, tolyl groups, xylyl groups, or similar aryl groups; benzyl groups, phenethyl groups, or similar aralkyl groups; chloromethyl groups, 3,3, 3-trifluoropropyl groups, or similar halogen-substituted alkyl groups. Among the above, most preferable are alkyl groups, especially methyl groups. The univalent organic groups that are free of aromatic rings and contain epoxy groups may be exemplified by 2-glycidoxyethyl groups, 3-glycidoxypropyl groups, 4-glycidoxybutyl groups, 2-(3,4-epoxycyclohexyl) ethyl groups, 3-(3,4-epoxycyclohexyl)propyl groups, 2-(3,4-epoxynorbornenyl) ethyl groups, 2-(3,4-epoxy-3-methylcyclohexyl)-2-methylethyl groups, or similar alkyl groups bonded to epoxy groups. Among the above, most preferable are 3-glycidoxypropyl groups and 2-3,4-epoxychlorohexyl) ethyl groups. One molecule may contain two or more such univalent epoxy-containing groups free of aromatic rings. The epoxy equivalent of component (A) (which is the number obtained by dividing the weight-average molecular weight of component (A) by the number of epoxy groups in one molecule of component (A)) may be within the range of 100 to 1000, preferably 100 to 700. This is because with the epoxy equivalent below the recommended lower level, a cured body of the composition of the present invention will not acquire sufficient flexibility, while the epoxy equivalent exceeding the recommended upper level will either impair curability and adhesive properties of the composition, or will produce highly brittle cured bodies.

In component (A), more than 20 mole %, preferably more than 50 mole %, and even more preferably, more than 80 mole % of $R^3$, should be phenyl groups. If the amount of the phenyl groups is below the recommended lower level, component (A) will either have insufficient miscibility with component (B) and insufficient adhesion to a substrate, or the body obtained by curing the composition will not acquire sufficient strength. It is recommended that aryl groups of $R^3$ comprise phenyl groups; "a", "b", and "c" correspond to average mole numbers for the case when the total mole number of the individual siloxanes units is equal to 1. In other words, a+b+c=1. It is recommended that a+b≠0. This is because, in the case when component (A) consists only of $[R^3SiO_{3/2}]$ units, its viscosity becomes too high, and it would be difficult to handle this component under industrial conditions. It is also recommended to provide the following conditions for "a": on average $0 \leq a \leq 0.8$, preferably on average $0 \leq a \leq 0.6$, and even more preferably on average $0.3 \leq a \leq 0.6$. If the above range is exceeded, the organopolysiloxane will have an extremely low molecular weight, and component (A) will either soak through to the surface of the cured body, or contaminate the surrounding environment. It is also recommended to provide the following conditions for "b": on average $0 \leq b \leq 0.8$, preferably on average $0 \leq b \leq 0.6$. If the above range is exceeded, the cured body becomes brittle. It is also recommended to provide the following conditions for "c": on average $0.2 \leq c \leq 1.0$, preferably on average $0.4 \leq c \leq 1.0$. If "c" is below the recommended lower limit, the composition either lose its adhesive properties, or the cured body will become brittle. If, on the other hand, the upper limit for "c" is exceeded, the composition will either become too viscous and difficult to handle during production, or the cured body will not possess sufficient flexibility.

Component (A) represented by siloxane unit formula (1) may be exemplified by specific organopolysiloxanes represented by the formulae given below. In these formulae, "a", "b", and "c" are the same as defined earlier, but "a" and "b" are not 0, and "x" and "y" satisfy the following conditions: $0.2 \leq x \leq 1.0$; $0 < y < 0.2$; a+x+y=1. Furthermore, in the following formulae, X designates glycidoxypropyl groups, and Y designates 2-(3,4-epoxycyclohexyl) ethyl groups.

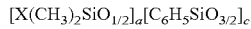

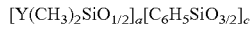

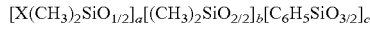

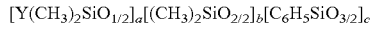

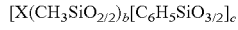

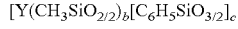

$[X(CH_3)_2SiO_{1/2}]_a[C_6H_5SiO_{3/2}]_x[CH_3SiO_{3/2}]_y$ $[Y(CH_3)_2SiO_{1/2}]_a[C_6H_5SiO_{3/2}]_x[CH_3SiO_{3/2}]_y$

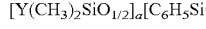

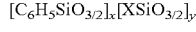

Component (A) may be prepared by various methods, e.g., by subjecting a phenyltrialkoxysilane and an aromatic-ring-free alkoxysilane having a univalent epoxy-containing organic group, e.g. 3-glycidoxypropyl trimethoxysilane or 2-3,4-epoxycyclohexyl) ethyltrimethoxysilane, to de-alcoholation and condensation reaction; by subjecting an alkoxysilane that is free of an aromatic ring and has an epoxy-containing univalent organic group of the invention, and a silanol group in a branched phenylpolyorganosiloxane obtained by co-hydrolysis and condensation of a phenyltrichlorosilane and phenyltrialkoxysilane, to de-alcoholation and condensation reaction; or by hydrosilylating a compound that is free of an aromatic ring and has an epoxy-containing univalent organic group and an unsaturated aliphatic group, and an organopolysiloxane having a silicon-bonded hydrogen atom prepared by co-hydrolysis and condensation of a phenyltrichlorosilane or phenyltrialkoxysilane in the presence of a dimethylchlorosilane or similar silanes with silicon-bonded hydrogen atoms.

Another method suitable for preparation of component (A) may comprise equilibrium polymerization of a branched phenylorganopolysiloxane obtained by subjecting a phenyltrichlorosilane or a phenyltrialkoxysilane to co-hydrolysis and condensation with a copolymer of a dimethylsiloxanes and a methyl (2-(3,4-epoxycyclohexyl) ethylsiloxane) capped at both molecular terminals with trimethylsiloxy groups or with a copolymer of a dimethylsiloxanes and a methyl (3-glycidoxypropyl) siloxane capped at both molecular terminals with trimethylsiloxy groups. The aforementioned equilibrium polymerization is carried out in the presence of a basic polymerization catalyst. Still another method may comprise equilibrium polymerization of a silicone resin composed of $[C_6H_5SiO_{3/2}]$ units and a cyclic methyl (3-glycidoxypropyl) siloxanes or a cyclic methyl (2-(3,4-epoxychlorohexyl)) ethylsiloxane in the presence of a basic polymerization catalyst. A further method may comprise equilibrium polymerization of a silicone resin composed of

[C₆H₅SiO_{3/2}] units and a cyclic methyl (3-glycidoxypropyl) siloxanes or a cyclic methyl (2-(3,4-epoxychlorohexyl)) ethylsiloxane and a cyclic dimethylsiloxane in the presence of an acidic or a basic polymerization catalyst.

Component (A) may comprise an organopolysiloxane of one type, or a mixture of organopolysiloxanes of two or more types. At 25° C., this component may be liquid or solid. When it is used in a solid state, it should be either combined with an organic solvent or heated, and uniformly mixed with other components. In order to facilitate compounding and handling, it is preferable to use component (A), which is liquid at 25° C. It is recommended that a weight-average molecular weight of component (A) be within the range of 500 to 10000, preferably 750 to 3000.

Component (A) may contain silanol groups and/or hydrolysable groups, e.g. alkoxy groups or acetoxy groups, which originate in the method of the preparation of the component (A).

Component (B), which is a linear-chain organopolysiloxane having at least two univalent organic groups that contain phenolic hydroxyl groups, comprises a cross-linking agent for component (A). Under the effect of component (C), that is described below, component (B) reacts with epoxy groups of component (A) and thus makes it possible to cross-link and cure the composition of the present invention. In component (B), univalent organic groups other than aforementioned univalent organic groups that contain phenolic hydroxyl groups may comprise alkyl groups, aryl groups, aralkyl groups, and halogen-substituted alkyl groups. It is recommended that component (B) contain a small number of silicon-bonded hydrogen atoms, hydroxyl groups, and alkoxy groups. At 25° C., component (B) may be solid or liquid, but the liquid form is preferable as it is more convenient for handling. More specifically, it is preferable to have component (B) with viscosity at 25° C. of 1 to 10⁶ mPa·s, preferably 100 to 5000 mpa·s. If the viscosity of component(B) is below the lower recommended level, a cured body obtained from the composition of the present invention will have low flexibility and mechanical strength. If viscosity exceeds the upper recommended level, it will be difficult to handle the composition in the production.

Preferably, component (B) is expressed by the following formula (2). The component of this formula provides a cured body from the composition of the present invention with high flexibility:

$$R^7_3 SiO (R^8_2 SiO)_m SiR^7_3 \qquad (2)$$

where $R^7$ and $R^8$ may be the same or different univalent organic groups, of which at least two univalent organic groups have phenolic hydroxyl groups. One molecule may contain two or more univalent organic groups with phenolic hydroxyl group, but to have two-such groups in one molecule is preferable. Preferable univalent organic groups with phenolic hydroxyl groups are phenol-bonded alkyl groups. Examples of these groups are the following:

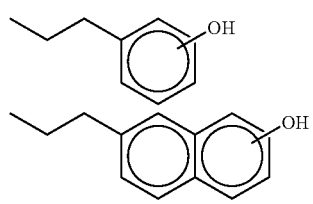

-continued

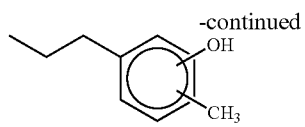

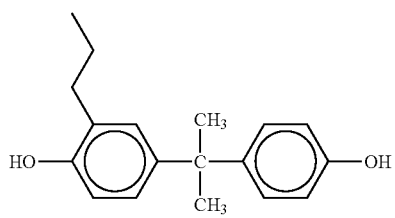

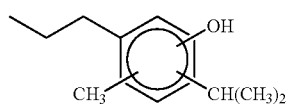

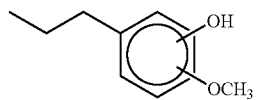

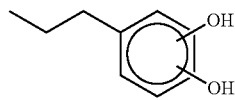

Other univalent organic groups may comprise methyl groups, ethyl groups, propyl groups, butyl groups, pentyl groups, hexyl groups, heptyl groups, or similar alkyl groups; phenyl groups, tolyl groups, xylyl groups, naphthyl groups, or similar aryl groups; benzyl groups, phenethyl groups, or similar aralkyl groups; vinyl groups, allyl groups, butenyl groups, pentenyl groups, hexenyl groups, or similar alkenyl groups; chloromethyl groups, 3,3,3-trifluoropropyl groups, or similar halogen-substituted alkyl groups. Among the above, most preferable are alkyl groups, especially methyl groups. In the above formulae (2), m is an integer with a value of 0 to 1000, preferably 0 to 100, and even more preferably, 0 to 20. If in the above formula "m" is selected in the recommended ranges, component (B) will have sufficiently low viscosity, will be easily miscible with component (A), and will be easy to handle. Furthermore, the curable silicone composition of the present invention can be liquefied by mixing it with an appropriate liquid non-solvent.

It is recommended to use component (B) in such an amount that a mole ratio of phenolic hydroxyl groups of component (B) to epoxy groups of component (A) is 0.2 to 5, preferably, 0.3 to 2.5, and even more preferably, 0.8 to 1.5. If the aforementioned mole ratio of phenolic hydroxyl groups of component (B) to epoxy groups of component (A) is below the recommended level, it would be difficult to cure the composition to a sufficient degree. If the aforementioned mole ratio exceeds the recommended level, then the cured body will have low mechanical characteristics.

Examples of preferable components (B) are given below. In the following formulae, "n" is an integer from 1 to 20, and "p" is an integer from 2 to 10.

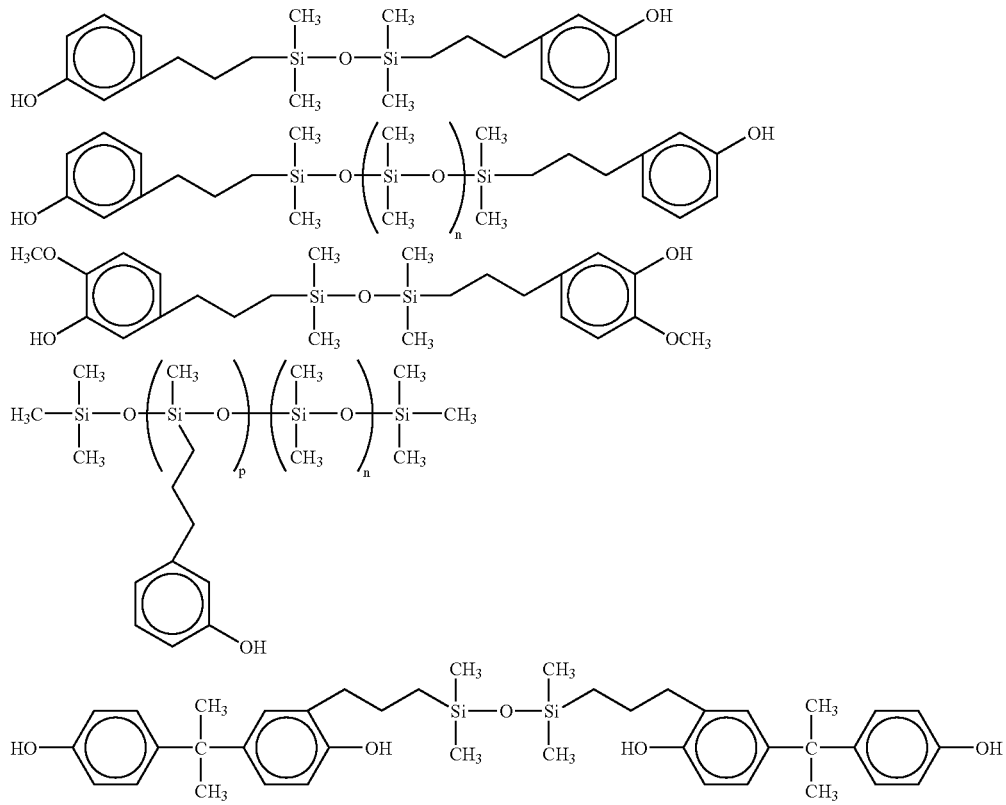

Component (B) can be prepared by methods known in the art. For example, it can be produced by carrying out an addition reaction conducted in the presence of a hydrosilation catalyst between a phenol compound that contains an alkenyl group and an organopolysiloxane that has silicon-bonded hydrogen atoms.

Component (C) accelerates the reaction between the epoxy groups of component (A) and the phenolic hydroxyl groups of component (B), i.e., accelerates curing of the composition of the present invention. Component (C) can be exemplified by tertiary amine compounds, organometallic compounds of aluminum, zirconium, etc., organophosphorous compounds such as phosphines, heterocyclic amines, boron complex compounds, organic ammonium salts, organic sulfonium salts, organic peroxides, or reaction products of the above compounds. The following are specific example of these compounds: triphenyl, phosphine, tributyl phosphine, tri(p-methylphenyl)phosphine, tri(nonylphenyl)phosphine, triphenylphosphine-triphenylborate, tetraphenylphosphine-tetraphenylborate, or similar phosphorous-type compounds; triethylamine, benzyldimethylamine, α-methylbenzyldimethylamine, 1,8-diaza-bicyclo-5.4.0-undec-7-ene, or similar tertiary amine compounds; 2-methylindazole, 2-phenylindazole, 2-phenyl-4-methylindazole, or similar indazole compounds. Since the curable composition of the present invention may be in use over an extended time, it is recommended to utilize an encapsulated curing accelerator. An encapsulated curing accelerator may comprise an encapsulated catalyst (HX-3088, the product of ASAHI KASEI Company, Ltd.) admixed with an amine catalyst in a bisphenol A epoxy resin.

There are no special restrictions with regard to an amount in which component (C) should be used in the composition of the present invention, provided that this amount is sufficient for curing. It is recommended, however, to use component (C) in an amount of 0.01 to 100 parts by weight, preferably 0.01 to 50 parts by weight, and even more preferably 0.1 to 5 parts by weight, for each 100 parts by weight of component (A).

In order to improve strength of a cured object obtained from the composition of the present invention, the latter may be mixed with a filler (D). The filler may comprise glass fiber, alumina fiber, ceramic fiber composed of alumina and silica, boron fiber, zirconia fiber, silicon carbide fiber, metal fiber, or similar fibrous filler; fused silica, crystalline silica, precipitated silica, fumed silica, baked silica, zinc oxide, baked clay, carbon black, glass beads, alumina, talc, calcium carbonate, clay, aluminum hydroxide, magnesium hydroxide, barium sulfate, aluminum nitride, boron nitride, silicon carbide, aluminum oxide, magnesium oxide, titanium oxide, kaolin, mica, zirconia, or similar powdered fillers. The aforementioned fillers can be used in a mixture of two or more. Although there are no special restrictions with regard to the average size and shape of the particles, for better formability it is recommended to use spherical silica with an average particle diameter within the range of 0.1 to 40 μm.

In order not to impair flowability, it is recommended to add component (D) in an amount of 0 to 2000 parts by weight, preferably, 50 to 1000 parts by weight for each 100 parts by weight of the sum of components (A) and (B).

For improving adhesion of the composition of the present invention to a substrate during curing and if necessary improving dispersion of component (D) in the composition of the present invention, the composition may be additionally compounded with coupling agents, such as a silane coupling agent, titanate coupling agent, etc. The silane coupling agent can be exemplified by 3-glycidoxypropyl trimethoxysilane, 3-glycidoxypropyl methyldiethoxysilane, 2-(3,4-epoxycyclohexyl) ethyltrimethoxysilane, or a similar epoxy-containing alkoxysilane; N-(2-aminoethyl)-3-aminopropyl trimethoxysilane, 3-aminopropyl triethoxysilane, N-phenyl-3-aminopropyl trimethoxysilane, or a similar amino-containing alkoxysilane; 3-mercaptopropyl trimethoxysilane, or a similar mercapto-containing alkoxysilane. The titanate coupling agent may be exemplified by i-propoxytitane tri(i-isostearate).

Other arbitrary components of the composition may comprise organic solvents such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, or similar alkoxysilanes; hexane, or similar aromatic solvents; methylethylketone, methylisobutylketone, or similar ketone-type solvents.

The curable composition of the present invention is prepared by uniformly mixing components (A), (B), (C), and, if necessary, component (D) and other arbitrary components. There are no limitations with regard to the method of mixing. For example, all the components (A), (B), (C), and, if necessary, component (D) and other arbitrary components, can be mixed altogether simultaneously; components (A) and (B) can be premixed and then the mixture can be combined with component (C) and, if necessary, with component (D) and other arbitrary components; components (A), (B), (C), and, if necessary, component (D) and other arbitrary components, can be mixed altogether simultaneously; components (A) and (B) and, if necessary, with component (D) and other arbitrary components, can be premixed, and then the mixture can be combined with component (C). There are no special restrictions with regard to equipment that can be used for mixing components (A), (B), (C), if necessary, with component (D) and other arbitrary components. This maybe uniaxial, biaxial continuous-action mixers, two-roll mixers, dental mixers, planetary mixers, kneader mixers, etc.

The curable silicone composition of the present invention can be used in various processes, such as molding, potting, casting, spreading in a powdered form, coat by dipping, etc. For more convenient handling in such processes as potting, screen printing, and application by spreading, where the composition is used in small quantities, it is preferable to have the composition in a liquid or a paste-like form. Since the products obtained by curing the curable silicone composition of the present invention possess excellent flexibility and adhesive properties, they are suitable for such applications as sealing, casting, coating, and adhesive agents for electrical parts and electronic elements.

EXAMPLES

The invention will be further described with reference to Practical Examples. The methods that were used for measuring characteristics of curable silicone compositions and cured bodies are given below.

[Viscosity]
Viscosity was measured with the use of a E-model viscometer (TOKIMC Co., Inc., DIGITAL VISCOMETER DV-U-E Type II) at 25° C. and 2.5/min. revolutions.

[Coefficient of Thermal Expansion]
The curable silicone composition was poured into the 4 mm-wide, 15 mm-long, and 4 mm-deep cavity of a mold. After defoaming at 70 mmHg, the composition was subjected to pressure curing for 60 min. at 150° C. and 2.5 MPa. The product was then subjected to secondary heating for 2 hours in an oven at 180° C. As a result, a cured sample was obtained. The obtained sample was used for measuring thermal expansion with the use of TMA (SHINKURKO Co., Ltd., Model TM-9200) with heating from 25° C. to 210° C. with a rate of 2.5° C./min.

[Coefficient of Composite Viscoelasticity]
The curable silicone composition was poured into the 10 mm-wide, 50 mm-long, and 2 mm-deep cavity of a mold. After defoaming at 70 mmHg, the composition was subjected to pressure curing for 60 min. at 150° C. and 2.5 MPa. The product was then subjected to secondary heating for 2 hours in an oven at 180° C. As a result, a cured sample was obtained. The obtained sample was used for measuring a coefficient of composite viscoelasticity at 25° C. with the use of an ARES-type viscoelastomer (a product of RHEOMETRIC Scientific Co., Inc.) with 0.5% twisting, 1 Hz frequency, and 3° C./min. heating rate for heating in the range from −50° C. to 150° C.

[Adhesiveness]
A solder resist (development-type solder resist, the product of TAIYO INK Co., Ltd., Type PSR-4000 CC02/CA40 CC02) was spread over the surface of a bis-maleimide-triazine resin (known as BT resin) plate. The coating was dried with ultraviolet radiation, exposed to light, and cured (for 1 hour at 150° C.). As a result, a 50-μm-thick solder-resist layer was formed on the BT plate as a sublayer. The curable silicone composition was applied in the amount of 1 cm$^3$ onto the aforementioned sublayer, the unit was heated for 2 hours in an oven at 125° C., and then heated for another 2 hours in an oven at 180° C. As a result, adhesion evaluation specimens were produced. This procedure was repeated in the same way except for using a glass plate, aluminum plate, nickel plate, and steel plate instead of aforementioned sublayer. The cured layer formed on the specimens was peeled off by means of a dental spatula, and the adhesion conditions were evaluated by observing the surfaces under a microscope. The following evaluation criteria were used: cohesive disconnection: ○; thin coating remains on the boundary surface: Δ; peeling of the boundary surface: X.

[Test of Curability]
A 15-mm-wide, 50 mm-long, 0.2 mm-deep cavity formed on a glass plate was filled by applying five layers of a 40-μm-thick tape with the use of a squeegee. The obtained specimen was loaded into a 150° C. hot-air circulation oven, and every 15 minutes the surface of the curable silicone composition was contacted by a dental spatula with tracking of the time when stringiness was no longer observed.

[Weight-Average Molecular Weight]
This characteristic was determined as a weight-average molecular weight recalculated for polystyrene and measured with GPC (gas permeation chromatography) by using toluene as a solvent Practical Example 1

A mixture was prepared from the following components: 25.0 parts by weight of organopolysiloxane represented by siloxane-unit formula (3) given below with a weight-average molecular weight equal to 1000, viscosity of 9630 mpa·s, and an epoxy equivalent of 345; 13.0 parts by weight of organopolysiloxane represented by siloxane-unit formula (4) given below and having viscosity of 3050 mpa·s (a ratio of a mole number of phenolic hydroxyl groups of organopolysiloxane represented by formula (4) to a mole number of epoxy groups of the organopolysiloxane represented by formula (3) was 1.0); 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product of ADOMATECH Co., an average particle diameter of 1.5 μm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 1.

$$[X(CH_3)_2SiO_{1/2}]_{0.4}[C_6H_5SiO_{3/2}]_{0.6} \quad (3)$$

(where X is 3-glycidoxypropyl group).

$$Z\text{-}(CH_3)_2SiO(CH_3)_2Si\text{-}Z \quad (4)$$

(where Z is 3-(m-hydroxyphenyl)propyl group).

Practical Example 2

A mixture was prepared from the following components: 25.0 parts by weight of organopolysiloxane represented by siloxane-unit formula (3) with a weight-average molecular weight equal to 1000, viscosity of 9630 mpa·s, and an epoxy equivalent of 345; 13.0 parts by weight of organopolysiloxane represented by siloxane-unit formula (4) and having viscosity of 3050 mpa-s (a ratio of a mole number of phenolic hydroxyl groups of organopolysiloxane represented by formula (4) to a mole number of epoxy groups of the organopolysiloxane represented by formula (3) was 1.0); 1.0 part by weight of 3-glycidoxypropyltrimethoxysilane; 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFNE, the product of ADOMATECH Co., an average particle diameter of 1.5 μm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 1.

Practical Example 3

A mixture was prepared from the following components: 21.0 parts by weight of organopolysiloxane represented by siloxane-unit formula (5) given below with a weight-average molecular weight equal to 1000, viscosity of 1290 mPa·s, and an epoxy equivalent of 270; 17.0 parts by weight of organopolysiloxane represented by siloxane-unit formula (4) given above and having viscosity of 3050 mpa·s (a ratio of a mole number of phenolic hydroxyl groups of organopolysiloxane represented by formula (4) to a mole number of epoxy groups of the organopolysiloxane represented by formula (5) was 1.0); 1.0 part by weight of 3-glycidoxypropyltrimethoxysilane; 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product of ADOMATECH Co., an average particle diameter of 1.5 μm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 1.

$$[X(CH_3)_2SiO_{1/2}]_{0.6}[C_6H_5SiO_{3/2}]_{0.4} \quad (5)$$

(where X is 3-glycidoxypropyl group).

Practical Example 4

A mixture was prepared from the following components: 24.0 parts by weight of organopolysiloxane represented by siloxane-unit formula (6) given below with a weight-average molecular weight equal to 2200, viscosity of 1900 mpa·s, and an epoxy equivalent of 345; 14.0 parts by weight of organopolysiloxane represented by siloxane-unit formula (4) given above and having viscosity of 3050 mpa·s (a ratio of a mole number of phenolic hydroxyl groups of organopolysiloxane represented by formula (4) to a mole number of epoxy groups of the organopolysiloxane represented by formula (6) was 1.0); 1.0 part by weight of 3-glycidoxypropyltrimethoxysilane; 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product of ADOMATECH Co., an average particle diameter of 1.5 μm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 1.

$$[Y(CH_3)_2SiO_{1/2}]_{0.4}[C_6H_5SiO_{3/2}]_{0.6} \quad (6)$$

(where Y is 2-(3,4-epoxycyclohexyl)ethyl group).

Comparative Example 1

A mixture was prepared from the following components: 23.0 parts by weight of a bisphenol-A type liquid epoxy resin (the product of JAPAN EPOXY RESIN Co., Ltd., EPICOTE 828, viscosity of 15 mPa·s, and an epoxy equivalent of 190); 17.0 parts by weight of a liquid phenol compound (the product of MEIWA KASEI Co., Ltd., MEH8000H); 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product-of ADOMATECH Co., an average particle diameter of 1.5 μm). As a result, a curable epoxy composition was prepared. The composition was defoamed in vacuum, and then a coefficient of thermal expansion, a coefficient of composite viscoelasticity, adhesive properties, and curability time were measured by the methods described above. The results of measurements are shown in Table 2. It was found that a cured body obtained from this composition had high composite modulus of elasticity equal to 2900 and had high rigidity.

Comparative Example 2

A mixture was prepared from the following components: 36.0 parts by weight of organopolysiloxane represented by siloxane-unit formula (7) given below with a weight-average molecular weight equal to 45000, viscosity of 17700 mPa·s, and an epoxy equivalent of 3850; 2.0 parts by weight of an organopolysiloxane represented by aforementioned formula (4) and having viscosity of 3050 mPa·s (a ratio of a mole number of phenolic hydroxyl groups of organopolysiloxane represented by formula (4) to a mole number of epoxy groups of the organopolysiloxane represented by formula (7) was 1.0); 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product of ADOMATECH Co., an average particle diameter of 1.5 µm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 2.

$$[(CH_3)_3SiO_{1/2}]_{0.003} [XCH_3SiO_{2/2}]_{0.024} [(CH_3)_2 SiO_{2/2}]_{0.972} \quad (7)$$

(where X is 3-glycidoxy propyl group)

Comparative Example 3

A mixture was prepared from the following components: 21.0 parts by weight of organopolysiloxane represented by siloxane-unit formula (8) given below with a weight-average molecular weight equal to 1500, viscosity of 1200 mpa·s, and an epoxy equivalent of 370; 17.0 parts by weight of an organopolysiloxane represented by formula (9) given below, having a weight-average molecular weight of 630 and viscosity of 840 mpa-s (a ratio of a mole number of phenolic hydroxyl groups of organopolysiloxane represented by formula (9) to a mole number of epoxy groups of the organopolysiloxane represented by formula (8) was 1.0); 1.0 part by weight of HX-3088 (an encapsulated amine catalyst, the product of ASAHI KASEI Co., Ltd., with the 40 wt. % amine-catalyst content); and 70 parts by weight of a spherical amorphous silica (ADOMAFINE, the product of ADOMATECH Co., an average particle diameter of 1.5 µm). As a result, a curable silicone composition was prepared. The composition was defoamed in vacuum and cured and tested with regard to the coefficient of thermal expansion and coefficient of composite viscoelasticity under the same conditions are above, except for injection into a mold and heating for 2 hours in an oven at 150° C. and then for another 2 hours at 180° C. The results of measurements are shown in Table 2.

$$[(CH_3)_3SiO_{1/2}]_{0.17} [R^9(CH_3)SiO_{2/2}]_{0.33} [(CH_3)_2 SiO_{2/2}]_{0.50} \quad (8),$$

where $R^9$ is a group that can be represented by the following formula:

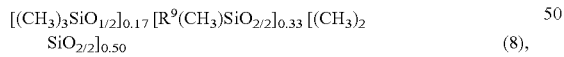

$$[(CH_3)_2SiO_{2/2}]_{0.5} [R^{10}(CH_3)SiO_{2/2}]_{0.5} \quad (9),$$

where $R^{10}$ is a group represented by the following formula:

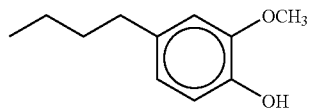

Comparative Example 4

A mixture was prepared from the following components: 16.0 parts by weight of organopolysiloxane represented by siloxane-unit formula (10) given below with a weight-average molecular weight equal to 950, viscosity of 177000 mPa—s, and an epoxy equivalent of 240; 22.0 parts by weight of an organopolysiloxane represented by formula (9) given above, having a weight-average molecular weight of 630 and viscosity of 840 mpa·s (a ratio of a mole number of phenolic hydroxyl groups of organopolysiloxane represented by formula (9) to a mole number of epoxy groups of the organopolysiloxane represented by formula (10) was 1.0); 1.0 part by weight of HX-3088 (an encapsulated amine catalyst, the product of ASAHI KASEI Co., Ltd., with the 40 wt. % arnine-catalyst content); 1.0 part by weight of 3-glycidoxypropyltrimethoxysilane; and 70 parts by weight of a spherical amorphous silica (ADOMAFINE, the product of ADOMATECH Co., an average particle diameter of 1.5 µm). As a result, a curable silicone composition was prepared. The composition was defoamed in vacuum and cured and tested with regard to the coefficient of thermal expansion and coefficient of composite viscoelasticity under the same conditions are above, except for injection into a mold and heating for 2 hours in an oven at 150° C. and then for another 2 hours at 180 ° C. The results of measurements are shown in Table 2.

Where $R^9$ is a group represented by the following formula:

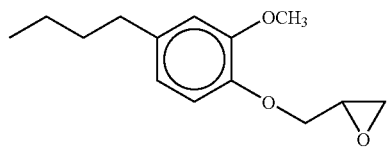

Comparative Example 5

A mixture was prepared from the following components: 17.0 parts by weight of organopolysiloxane represented by siloxane-unit formula (11) given below with a weight-average molecular weight equal to 696, viscosity of 110 mPa·s, and an epoxy equivalent of 174; 20.0 parts by weight of an organopolysiloxane represented by formula (4) given above, having viscosity of 3050 mPa-s (a ratio of a mole number of phenolic hydroxyl groups of organopolysiloxane represented by formula (4) to a mole number of epoxy groups of the organopolysiloxane represented by formula (11) was 1.0); 1.0 part by weight of HX-3088 (an encapsulated amine catalyst, the product of ASAHI KASEI Co., Ltd., with the 40 wt. % amine-catalyst content); and 60 parts by weight of a spherical amorphous silica (ADOMAFINE, the product of ADOMATECH Co., an average particle diameter of 1.5 μm). As a result, a curable silicone composition was prepared. The composition was defoamed in vacuum, and then a coefficient of thermal expansion, a coefficient of composite viscoelasticity, adhesive properties, and curability time were measured by the methods described above. The results of measurements are shown in Table 2.

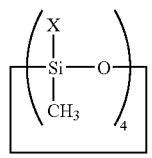
(11)

(where X is a glycidoxypropyl group).

TABLE 1

|  | Pr. Ex. 1 | Pr. Ex. 2 | Pr. Ex. 3 | Pr. Ex. 4 |
| --- | --- | --- | --- | --- |
| Viscosity (Pa · s) | 10 | 14 | 7 | 15 |
| Coefficient of thermal expansion (ppm/° C.) | 110 | 110 | 120 | 100 |
| Coefficient of composite viscoelasticity (MPa) | 80 | 86 | 90 | 90 |
| Adhesive Properties (solder resist) | ○ | ○ | ○ | ○ |
| Adhesive Properties (nickel) | ○ | ○ | ○ | ○ |
| Adhesive Properties (copper) | ○ | ○ | ○ | ○ |
| Adhesive Properties (aluminum) | ○ | ○ | ○ | ○ |
| Adhesive Properties (glass) | ○ | ○ | ○ | ○ |
| Curing time (min) | 15 | 15 | 15 | 15 |

TABLE 2

|  | Comparative Examples | | | | |
| --- | --- | --- | --- | --- | --- |
|  | 1 | 2 | 3 | 4 | 5 |
| Viscosity (Pa · s) | 199 | >500 | 27 | 81 | 5 |
| Coefficient of thermal expansion (ppm/° C.) | 67 | —* | 130 | 80 | 120 |
| Coefficient of composite viscoelasticity (MPa) | 2900 | —* | 60 | 350 | 80 |
| Adhesive Properties (solder resist) | ○ | X | ○ | ○ | X |
| Adhesive Properties (nickel) | ○ | X | ○ | ○ | X |
| Adhesive Properties (copper) | ○ | X | ○ | ○ | X |
| Adhesive Properties (aluminum) | ○ | X | ○ | ○ | ○ |
| Adhesive Properties (glass) | ○ | X | ○ | ○ | ○ |
| Curing time (min) | 30 | 90 | 120 | 120 | 15 |

*Cured objects are extremely brittle, and the characteristics could not be measured.

The invention claimed is:

1. A curable silicone composition comprising:
    (A) an organopolysiloxane represented by the siloxane unit formula (1) given below and having at least two univalent organic groups that contain epoxy groups and are free of aromatic rings:

$[R^1{}_3SiO_{1/2}]_a[R^2{}_2SiO_{2/2}]_b[R^3SiO_{3/2}]_c$ (1)

where $R^1$, $R^2$, and $R^3$ are univalent organic groups, at least two of which are univalent organic groups which contain epoxy groups and are free of aromatic rings; more than 20 mole % of $R^3$ are aryl groups; $a+b+c=1$; on average, "a" satisfies the following condition: $0 \leq a \leq 0.8$; on average, "b" satisfies the following condition: $0 \leq b \leq 0.8$; and, on average, "c" satisfies the following condition: $0.2 \leq c \leq 1.0$;
    (B) an organopolysiloxane represented by the following formula (4):

$Z—(CH_3)_2SiO(CH_3)_2Si—Z$ (4)

where Z is 3-(m-hydroxyphenyl)propyl group; and
    (C) a curing accelerator.
2. The curable silicone composition of claim 1, further comprising a filler (D).
3. The curable silicone composition of claim 2, where component (A) is liquid.
4. The curable silicone composition of claim 2, where in the siloxane unit formula (1), $0<a \leq 0.8$; and $b=0$.
5. The curable silicone composition of claim 2, where component (B) is used in an amount of 1 to 1000 parts by weight, and component (C) in an amount of 0.01 to 100 parts by weight for each 100 parts by weight of component (A).
6. The curable silicone composition of claim 2, where the epoxy group of component (A) is a glycidoxy group or a 2,4-epoxycyclohexyl group.
7. The curable silicone composition of claim 2, which is in a liquid or a paste-like form.
8. The curable silicone composition of claim 1, where component (A) is liquid.
9. The curable silicone composition of claim 1, where in the siloxane unit formula (1), $0<a \leq 0.8$; and $b=0$.
10. The curable silicone composition of claim 1, where component (B) is used in an amount of 1 to 1000 parts by weight, and component (C) in an amount of 0.01 to 100 parts by weight for each 100 parts by weight of component (A).
11. The curable silicone composition of claim 1, where the epoxy group of component (A) is a glycidoxy group or a 2,4-epoxycyclohexyl group.
12. The curable silicone composition of claim 1, which is in a liquid or a paste-like form.
13. A cured product obtained by curing the curable silicone composition according to claim 1.

* * * * *

UNITED STATES PATENT AND TRADEMARK OFFICE
CERTIFICATE OF CORRECTION

| | |
|---|---|
| PATENT NO. | : 7,781,522 B2 |
| APPLICATION NO. | : 10/578798 |
| DATED | : August 24, 2010 |
| INVENTOR(S) | : Yoshitsugu Morita et al. |

It is certified that error appears in the above-identified patent and that said Letters Patent is hereby corrected as shown below:

ON THE COVER OF PATENT:

Cover Page, Inventors: after "Morita", please delete "Chiba Prefecture" and replace with -- Ichihara-shi --

Cover Page, Inventors: after "Isshiki", please delete "Ehime Prefecture" and replace with -- Masaki-cho --

Cover Page, Inventors: after "Ueki", please delete "Chiba Prefecture" and replace with -- Ichihara-shi --

IN THE CLAIMS

Column 16, line 15, after "condition:," please delete "$0 \leq 0.8$" and insert therein -- $0 \leq b \leq 0.8$ --

Signed and Sealed this
Fifteenth Day of March, 2011

David J. Kappos
*Director of the United States Patent and Trademark Office*